United States Patent [19]
Atobe et al.

[11] Patent Number: 6,146,606
[45] Date of Patent: Nov. 14, 2000

[54] REACTIVE AGENT AND PROCESS FOR DECOMPOSING NITROGEN FLUORIDE

[75] Inventors: Hitoshi Atobe; Toraichi Kaneko, both of Kanagawa, Japan

[73] Assignee: Showa Denko Kabushiki Kaisha, Tokyo, Japan

[21] Appl. No.: 09/473,134

[22] Filed: Dec. 28, 1999

Related U.S. Application Data

[60] Provisional application No. 60/147,142, Aug. 4, 1999.

[30] Foreign Application Priority Data

Feb. 9, 1999 [JP] Japan ................................ 11-030883
Jun. 25, 1999 [JP] Japan ................................ 11-179123

[51] Int. Cl.$^7$ ........................................................ B01J 8/00
[52] U.S. Cl. .................................. 423/239.1; 423/240 R; 502/324; 502/325; 502/330; 502/331; 502/332; 502/338; 502/340; 502/341; 502/342; 502/343; 502/344; 502/345; 502/349; 502/352; 502/355
[58] Field of Search ............................ 423/239.1, 240 R; 502/324, 325, 330, 331, 332, 338, 340, 344, 341, 342, 343, 345, 349, 352, 355

[56] References Cited

U.S. PATENT DOCUMENTS

| | | | |
|---|---|---|---|
| 4,156,598 | 5/1979 | Woytek et al. | 423/239.1 |
| 4,329,517 | 5/1982 | Taniguchi et al. | 568/804 |
| 4,933,158 | 6/1990 | Aritsuka et al. | 423/210 |
| 5,401,473 | 3/1995 | Yoshino et al. | 422/177 |
| 5,879,646 | 3/1999 | Orihara et al. | 423/239.1 |
| 5,900,385 | 5/1999 | Dahn et al. | 502/302 |
| 5,935,540 | 8/1999 | Otsuka et al. | 423/239.1 |

FOREIGN PATENT DOCUMENTS

| | | | |
|---|---|---|---|
| 63-48569 | 9/1988 | Japan | B01D 53/34 |
| 7-171342 | 7/1995 | Japan | B01D 53/88 |
| 8-17911 | 2/1996 | Japan | B01D 53/68 |
| 2823486 | 9/1998 | Japan | B01D 53/68 |
| 11-47551 | 2/1999 | Japan | B01D 53/68 |

*Primary Examiner*—Tom Dunn
*Attorney, Agent, or Firm*—Sughrue, Mion, Zinn, Macpeak & Seas, PLLC

[57] ABSTRACT

A process for decomposing nitrogen fluoride, comprising contacting gaseous nitrogen fluoride with a solid reactive agent for decomposition at 200° C. or more to fix the fluorine component in the nitrogen fluoride to the reactive agent and at the same time control generation of nitrogen oxides, fluorocarbon and carbon monoxide as by-products, the reactive agent containing elemental carbon; aluminum compound, iron compound, manganese compound and/or alkaline earth metal; alkali metal compound; and nickel compound, tin compound and/or copper compound.

11 Claims, 2 Drawing Sheets

6,146,606

REACTIVE AGENT AND PROCESS FOR DECOMPOSING NITROGEN FLUORIDE

CROSS REFERENCE TO RELATED APPLICATIONS

This application is an application filed under 35 U.S.C. §111(a) claiming benefit pursuant to 35 U.S.C. §119(e)(i) of the filing date of Provisional Application No. 60/147,142 filed Aug. 4, 1999 pursuant to 35 U.S.C. §111(b).

FIELD OF THE INVENTION

The present invention relates to a reactive agent and a process for decomposing nitrogen fluoride.

BACKGROUND OF THE INVENTION

Nitrogen fluoride includes four types, namely, azine fluoride ($N_3F$), dinitrogen difluoride ($N_2F_2$), nitrogen trifluoride ($NF_3$) and dinitrogen tetrafluoride ($N_2F_4$). Of these, nitrogen trifluoride ($NF_3$) is a representative nitrogen fluoride. Nitrogen trifluoride is a physically and chemically stable gas at ordinary temperature but under conditions such as heat ultraviolet ray and plasma discharge, the nitrogen trifluoride is decomposed to release active fluorine. Therefore, this gas is used, for example, as a gas for etching or cleaning in semiconductor processes.

When nitrogen trifluoride gas is employed for the above-described uses, the exhaust gas evolved contains nitrogen fluoride as the decomposition product of nitrogen trifluoride, such as dinitrogen tetrafluoride ($N_2F_4$) and dinitrogen difluoride ($N_2F_2$), and undecomposed nitrogen trifluoride. These nitrogen fluorides are highly toxic and have a large global warming potential coefficient (GWP value). Accordingly, nitrogen fluorides present in the exhaust gas must be decomposed into harmless substances before they are released into the atmosphere.

Several techniques have heretofore been proposed for decomposing nitrogen fluorides contained in the exhaust gas. The methods proposed are roughly classified into (1) decomposition by a reactive agent (catalyst) and (2) decomposition by combustion. The former method is advantageous in that the apparatus can be theoretically simplified in construction as compared with the latter method, and a large number of simple and easy techniques have been proposed. In principle, these techniques achieve the object by converting fluorine components in the nitrogen fluoride into easily decomposable fluoride gases such as $SiF_4$, $BF_3$ and $WF_6$, into stable solid fluorides such as $AlF_3$ and $FeF_3$, or into fluorocarbon gases such as $CF_4$. However, the method of converting nitrogen fluoride into easily decomposable gaseous fluorides is not necessarily simple in view of the treatment process as a whole because a secondary treatment of the fluoride gas is necessary. Similarly, the method of converting nitrogen fluoride into stable solid fluorides is not necessarily a simple and easy method because when a metal oxide is used, $NO_z$ is generated as by-product and a special treatment such as reduction of $NO_x$ is necessary. Furthermore, the method of converting nitrogen fluoride into stable gaseous fluorocarbon is not preferred because the fluorocarbon itself is a substance having a high global warming potential coefficient.

SUMMARY OF THE INVENTION

An object of the present invention is to provide a reactive agent and a process for decomposing nitrogen fluoride, which can very efficiently decompose nitrogen fluoride, particularly nitrogen trifluoride, used as a gas for etching or cleaning in semiconductor processes or the like, through a simple operation without generating any substance as by-product adversely affecting the environment.

DESCRIPTION OF THE PREFERRED EMBODIMENTS

Figure 1:
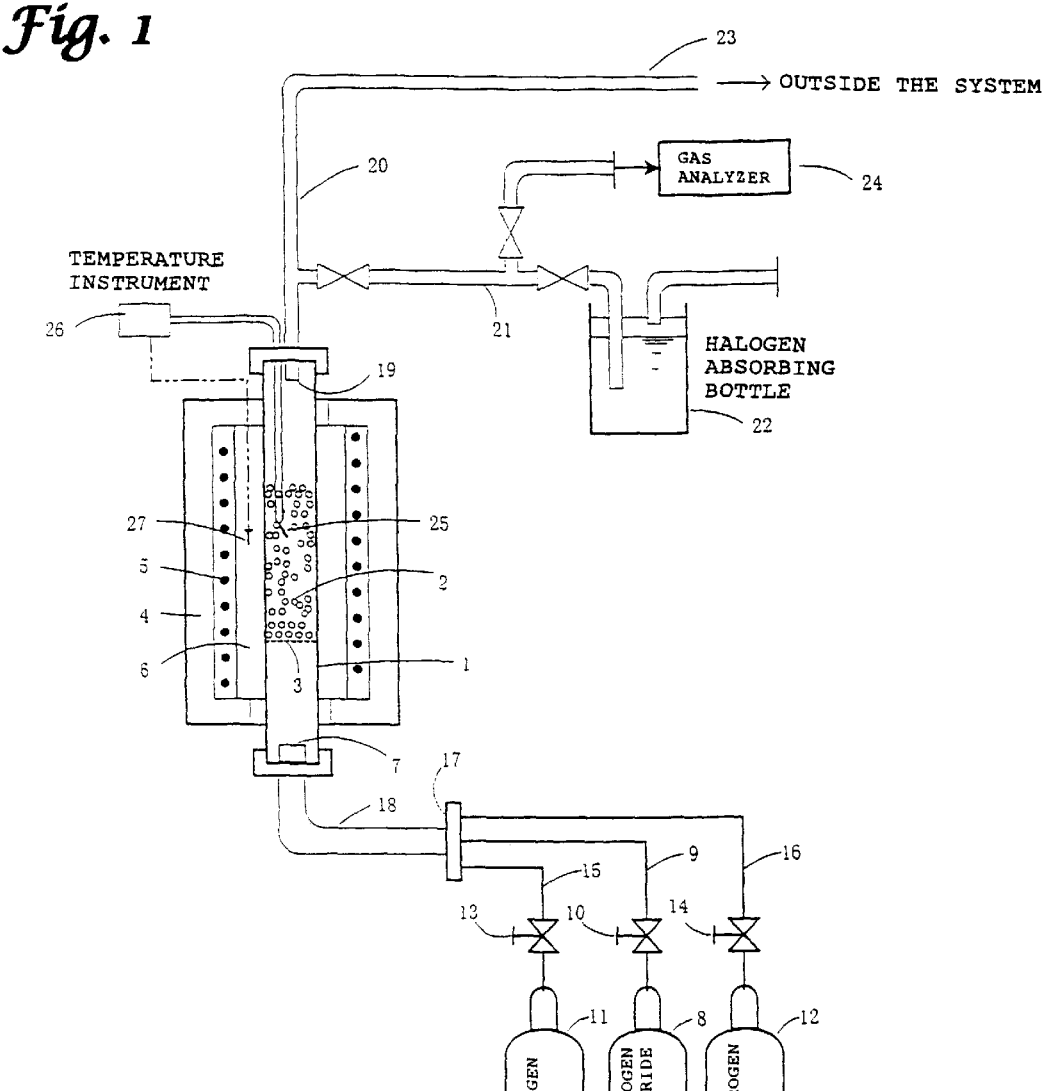
FIG. 1 is a flow sheet of machinery arrangement showing one example of the apparatus for practicing the process of the present invention.

As a result of extensive investigations to solve the problems in conventional techniques, the present inventors have found that the above-described object can be attained by contacting a nitrogen fluoride gas with a solid reactive agent comprising compounds of the following groups (I) to (IV), more specifically, elemental carbon in group (I), aluminum compounds, iron compounds, manganese compounds and/or alkaline earth metal compounds as group (II), alkali metal compounds in group (III), and nickel compounds, tin compounds and/or copper compounds in group (IV). Furthermore, the present inventors have found that when the temperature of the contacting with the reactive agent is set in the range of from 250 to 450° C., generation of fluorocarbon, nitrogen oxides and carbon monoxide as by-products can be controlled. The present invention has been accomplished based on these findings.

The present invention relates to a reactive agent and a process for decomposing nitrogen fluoride described in (1) to (11) below:

(1) a reactive agent for decomposing nitrogen fluoride, comprising compounds of the following groups (I) to (IV):

group (I): elemental carbon;
group (II): aluminum compounds, iron compounds, manganese compounds and/or alkaline earth metal compounds;
group (III): alkali metal compounds; and
group (IV): nickel compounds, tin compounds and/or copper compounds;

(2) the reactive agent for decomposing nitrogen fluoride as described in (1) above, wherein the elemental carbon of group (I) present in the reactive agent is activated carbon, carbon black, coke, char carbon, coal, pitch or charcoal;

(3) the reactive agent for decomposing nitrogen fluoride as described in (1) or (2) above, wherein the compounds of group (II) present in the reactive agent, comprise aluminum compounds such as aluminum oxide or aluminum hydroxide, iron compounds such as iron oxide or iron hydroxide, manganese compounds such as manganese oxide or manganese hydroxide, the alkaline earth metal compounds such as oxide, hydroxide or carbonate of alkaline earth metals;

(4) the reactive agent for decomposing nitrogen fluoride as described in any one of (1) to (3) above, wherein the alkali metal compound of group (III) present in the reactive agent is an oxide, hydroxide, carbonate, phosphate, aluminate, nitrate or sulfate of an alkali metal;

(5) the reactive agent for decomposing nitrogen fluoride as described in any one of (1) to (4) above, wherein in the compounds of group (IV) present in the reactive agent, are nickel compounds such as nickel oxide or nickel hydroxide, tin compounds such as stannic oxide or metastannic acid, and copper compounds such as copper oxide or copper hydroxide;

(6) the reactive agent for decomposing nitrogen fluoride as described in any one of (1) to (5) above, wherein the composition ratio of compounds of groups (I) to (IV) present in the reactive agent is in terms of the atomic ratio of each metal present in the compounds of groups (II) to (IV) assuming that the atomic ratio of the elemental carbon of group (I) is 1, such that the compound of group (II) is from 0.05 to 1.0, the compound of group (III) is from 0.01 to 0.2, and the compound of group (IV) is from 0.01 to 0.2;

(7) the reactive agent for decomposing nitrogen fluoride as described in any one of (1) to (6) above, wherein the total weight of the elemental carbon of group (I) and metal atoms present in the compounds of groups (II) to (IV) is 50 wt % or more based on the weight of the reactive agent;

(8) the reactive agent for decomposing nitrogen fluoride as described in any one of (1) to (7) above, wherein the nitrogen fluoride is nitrogen trifluoricle;

(9) a process for decomposing nitrogen fluoride, comprising contacting a gas containing nitrogen fluoride with a reactive agent for decomposition described in any one of (1) to (8) above at 200° C. or more;

(10) the process for decomposing nitrogen fluoride as described in (9) above, wherein the process comprises contacting a gas containing nitrogen fluoride with a reactive agent for decomposition described in any one of (1) to (8) above at a temperature of 450° C. or less to control generation of fluorocarbon as a by-product; and

(11) the process for decomposing nitrogen fluoride as described in (10) above, wherein the process comprises contacting a gas containing nitrogen fluoride with a reactive agent for decomposition described in any one of (1) to (8) above at a temperature of 250° C. or more to control generation of nitrogen oxides, fluorocarbon and carbon monoxide as by-products.

That is, the present invention provides a reactive agent for decomposing nitrogen fluoride, capable of very efficiently decomposing nitrogen fluoride through a simple operation and at the same time, detoxifying fluorine decomposed by fixing it to the reactive agent, and also provides a process for decomposing nitrogen fluoride using the reactive agent, in which substances having adverse effect on the environment are not generated as a by-product.

The reactive agent for decomposing nitrogen fluoride of the present invention is described below.

The reactive agent for decomposing nitrogen fluoride of the present invention comprises compounds in the following groups (I) to (IV):
  group (I): elemental carbon;
  group (II): aluminum compounds, iron compounds, manganese compounds and/or alkaline earth metal compounds;
  group (III): alkali metal compounds; and
  group (IV): nickel compounds, tin compounds and/or copper compounds.

The elemental carbon as the compound of group (I) is solid carbon present in elemental form and contributes to the decomposition of nitrogen fluoride when it is present together with the compounds of groups (II) to (IV). Examples thereof include activated carbon, carbon black, cokes, char carbon, coal, pitch and charcoal. In addition, carbon fiber, graphite and those mainly comprising an inorganic carbonaceous material may also be used. These elemental carbons may be used either individually or may be used by combining two or more thereof at an arbitrary ratio. The elemental carbon preferably is in the form of a powder or a granule. In a preferred embodiment, activated carbon, carbon black or coke in a powder form is used. The activated carbon has strong adsorption ability and is inexpensive and easily available as compared with other elemental carbons, therefore, use of activated carbon is preferred.

With respect to the amounts of compounds of respective groups in the reactive agent, the relative ratio of compounds of groups (II) to (IV) is specified based on the content of elemental carbon. Accordingly, the amount of elemental carbon in the reactive agent is decided by the relation with the amounts of compounds of groups (II) to (IV). If the relative amount of elemental carbon is too small, generation of nitrogen oxides as by-products cannot be controlled and a high decomposition ratio cannot be achieved, whereas if the relative amount of elemental carbon is excessively large, generation of fluorocarbon as a by-product cannot be controlled and also a high decomposition ratio cannot be achieved.

The compounds of group (II) are described below.

The aluminum compounds, iron compounds, manganese compounds or alkaline earth metal compounds of group (II) plays a role of detoxifying nitrogen fluoride by fixing fluorine to the metal of the compound in the form of a stable metal fluoride.

Examples of aluminum compounds which can be present in the reactive agent include aluminum oxide (e.g., $Al_2O_3$) and aluminum hydroxide (e.g., $Al(OH)_3$). Examples of iron compounds include iron oxide (e.g., $FeO$, $Fe_2O_3$, $Fe_3O_4$) and iron hydroxide (e.g., $Fe(OH)_2$ $FeO(OH)$). Examples of manganese compounds include manganese oxide (e.g., $MnO$, $Mn_2O_3$ $MnO_2$) and manganese hydroxide (e.g., $Mn(OH)_2$ $MnO(OH)$). Among these aluminum, iron and manganese compounds, oxides are preferred, and alumina ($Al_2O_3$), iron oxide ($Fe_2O_3$), manganese dioxide ($MnO_2$) are more preferred. These compounds are easily available commercially and advantageously stable and easy to handle.

Examples of the alkaline earth metal compounds include oxides, hydroxides, hydrogencarbonates and carbonates of magnesium, calcium, strontium or barium. In particular, oxides, hydroxides or carbonates of magnesium or calcium are preferred. These compounds included in group (II) may be used either individually or in combination by mixing two or more thereof at an arbitrary ratio.

The amount of the compound of group (II) present is in terms of the atomic ratio assuming that elemental carbon is 1.0, from 0.05 to 1.0, preferably from 0.1 to 1.0, more preferably from 0.2 to 0.8. If the atomic ratio is less than 0.05, the relative amount of elemental carbon excessively increases and generation of fluorocarbon as a by-product cannot be controlled, then, a high decomposition ratio cannot be attained. If the atomic ratio exceeds 1.0, the amounts of compounds of groups (I), (III) and (IV) decrease in proportion, as a result, generation of nitrogen oxides as by-products cannot be controlled.

The compound of group (III) is described below.

The alkali metal compound of group (III) when it is present together with the elemental carbon of group (I) and the compounds of groups (II) and (IV), can exert the effect of allowing the decomposition of nitrogen fluoride to proceed in the low temperature region, controlling generation of nitrogen oxides and fluorocarbons as by-products, and performing the decomposition at a high decomposition ratio.

Examples of alkali metal compounds include oxides, hydroxides, carbonates, phosphates, aluminates, nitrates and sulfates of lithium, sodium, potassium, rubidium or cesium. These compounds may be used either individually or as a combination of two or more thereof. In the case of use in combination, the compounds may be mixed at an arbitrary ratio. Among these alkali metal compounds, hydroxides or carbonates of sodium or potassium are preferred and these are known to provide excellent effect. The alkali metal compound may be mixed as it is when the compound is powder, and when it is a lump, the compound may be mixed after pulverizing it to a size of 100 μm or less, preferably 10 μm or less. An aqueous solution of the compound may also be used.

The amount of the compound of group (III) is in terms of the atomic ratio assuming that the elemental carbon is 1.0, from 0.01 to 0.2, preferably from 0.01 to 0.1, more preferably from 0.02 to 0.08. Even if the compound is present in excess of an atomic ratio of 0.2, the effect does not increase and this is disadvantageous, because the amount of the elemental carbon of group (I) and the compounds of groups (II) and (IV) relatively decreases.

The compounds of group (IV) are described below.

The nickel compound, tin compound or copper compound of group (IV) when it is present together with the elemental carbon of group (I) and the compounds of groups (II) and (III), exerts the effect of controlling generation of carbon monoxide, fluorocarbon gas and nitrogen oxides as by-products and performing the decomposition at a high decomposition ratio.

Examples of nickel compounds which can be added to the reactive agent include nickel oxide (e.g., NiO, $Ni_2O_3$, $Ni_3O_4$) as oxide of nickel, and nickel hydroxide (e.g., $Ni(OH)_2$) as hydroxide of nickel. Examples of tin compounds include stannic oxide (e.g., $SnO_2$) and metastannic acid (e.g., $SnO_2.nH_2O$) as oxides of tin. Examples of copper compounds include copper oxide (e.g., $Cu_2O$, CuO) as oxides of copper, and copper hydroxide (e.g., $Cu(OH)_2$) as hydroxide of copper. Among these nickel, tin and copper compounds, oxides are preferred, and in the case of nickel, nickel oxide (NiO), in the case of tin, stannic oxide ($SnO_2$), and in the case of copper, copper oxide (CuO) are more preferred. These oxides are easily available in the market, and the form is advantageously stable and easy to handle.

The amount of the compound of group (IV) is in terms of the atomic ratio assuming that the elemental carbon is 1.0, from 0.01 to 0.2, preferably from 0.02 to 0.1, more preferably from 0.02 to 0.08. Even if the compound is present in excess of an atomic ratio of 0.2, the effect does not increase and this is disadvantageous, because the contents of the elemental carbon of group (I) and the compounds of groups (II) and (III) relatively decrease.

The process for decomposing nitrogen fluoride according to the present invention is characterized by the use of a solid reactive agent for decomposition comprising a substance of group (I) (elemental carbon), a compound of group (II) (aluminum compound, iron compound, manganese compound and/or alkaline earth metal compound), a compound of group (III) (alkali metal compound) and a compound of group (IV) (nickel compound, tin compound and/or copper compound). This reactive agent for decomposition suitably has a composition ratio in terms of the atomic ratio of metals contained in the compounds of groups (II) to (IV) assuming that the atomic ratio of the substance of group (I) is 1.0, such that the compound of group (II) is from 0.05 to 1.0, the compound of group (III) is from 0.01 to 0.2, and the compound of group (IV) is from 0.01 to 0.2. The composition ratio is expressed by the atomic ratio because when the compounds of groups (II) to (IV) are contained in various compound forms such as oxide, hydroxide or carbonate, the ratio of metal components contained in the compounds is important. When nitrogen fluoride gas is contacted with this reactive agent at an appropriate temperature,, nitrogen fluoride decomposes and the fluorine component generated by the decomposition reacts with the compound of group (II) in the reactive agent to be fixed as a metal fluoride and thereby detoxified. Furthermore, the substance of group (I) and the compounds of groups (III) and (IV) control the generation of, for example, fluorocarbon gas, nitrogen oxides and carbon monoxide as by-products during the decomposition reaction, so that the nitrogen fluoride can be efficiently and safely decomposed.

The total weight of metal atoms in the elemental carbon of group (I) and the compounds of groups (II) to (IV) is preferably 50 wt % or more of the entire reactive agent. Even if the total weight is less than 50 wt %, nitrogen fluoride may be decomposed, however, in order to efficiently decompose the nitrogen fluoride, the total weight is preferably 50 wt % or more. When the compounds of groups (II) to (IV) are added in the form of a metal salt, components other than the metals are present as remaining components in the compounds. Most of the remaining components are preferably occupied by oxygen, however, water, $CO_2$ or other components derived from the starting materials may also be present.

As described above, the reactive agent for decomposing nitrogen fluoride of the present invention is a solid consisting essentially of elemental carbon of group (I), aluminum compound, iron compound, manganese compound and/or alkaline earth metal compound of group (II), alkali metal compound of group (III), and nickel compound, tin compound and/or copper compound of group (IV). This solid reactive agent is preferably in the granular form in order to increase opportunities of contacting nitrogen fluoride to be decomposed. The particle size thereof is suitably from 0.1 to 10 mm, preferably from 1 to 5 mm.

A granular reactive agent may be obtained through the steps of mixing the starting materials of groups (I) to (IV) each in the form of powder, granulating the powder mixture together with an appropriate amount of water and if desired, with an addition of an appropriate binder, and drying the granulated mixture obtained to evaporate the water present. As the binder, an organic binder such as polyvinyl alcohol (PVA) or an inorganic binder such as silicon oxide may be used, however, the binder must be added in an amount of not affecting the performance of the resulting reactive agent for decomposition.

The starting powder materials each preferably has a particle size of 100 μm or less and they are preferably mixed uniformly using a kneader or the like. A kneader where mixing and granulation are simultaneously performed may be used, or kneader may be used to perform mixing and granulation separately. For example, the raw materials may be mixed and granulated simultaneously using a Henschel mixer or a vertical mixer, or may be mixed using a Henschel mixer or a V-type mixer and then granulated using a pan type pelletizer or a drum pelletizer.

The temperature of the drying after granulation may be usually from 100 to 200° C., however, the drying is preferably performed such that the amount of water released on heating at 400° C. in an inert atmosphere can be as small as 5 wt % or less, because the reactive agent for decomposition of the present invention preferably has a small water content.

The granular reactive agent obtained through the above-described steps may be used after baking it. Usually, a temperature up to 400° C. may be used for the baking,, however, when the compounds of groups (II) to (IV) each is used in the form of a hydroxide, the baking is preferably performed at a temperature sufficiently high to allow the dehydration reaction of hydroxides to proceed. The reactive agent for decomposition of the present invention preferably has a small water content as described above and also preferably does not generate water during the decomposition reaction, accordingly, the baking treatment is preferably performed such that the amount of water released on heating at 400° C. in an inert atmosphere can be as small as 5 wt % or less.

The baking step is suitably performed under the conditions of giving a baked product deprived of water content or volatile matters and having an appropriate strength. However, in order to prevent oxidative consumption of the carbons in the starting materials blended, the baking is preferably performed under heating in an inert atmosphere. In an inert atmosphere, the heat treatment can be performed at high temperatures and the resulting baked product can have high strength. The baking may be performed using continuous equipment such as a rotary kiln or may be performed in a stationary furnace.

The decomposition process using the thus-prepared reactive agent is described below.

In the present invention, the reaction conditions must be appropriately controlled, such as reaction temperature, concentrations of nitrogen fluoride and oxygen in the exhaust gas to be decomposed, form of reactive agent and components of reactive agent. Among these, the reaction temperature is a very important condition. More specifically, in the reaction of the present invention, a reaction of generating fluorocarbon, nitrogen oxides and carbon monoxide takes place as a side reaction. For completely fixing the fluorine component in the nitrogen fluoride to the reactive agent and thereby controlling the occurrence of side reaction, the temperature on contacting of nitrogen fluoride with the reactive agent, actually the reactive agent temperature is set to from 250 to 450° C., preferably from 300 to 400° C. If the reaction temperature is less than this range, nitrogen oxides are generated, whereas if it exceeds the range, fluorocarbon is generated. Thus, reaction temperatures in excess of or less than the above-described range are disadvantageous.

A process and an apparatus for decomposing nitrogen fluoride using the above-described reactive agent are described below.

The decomposition of nitrogen fluoride according to the process of the present invention may be performed by passing a nitrogen fluoride-containing gas as a gas to be treated through a reactor filled with the reactive agent. At this time, the reactive agent temperature and also the reaction temperature are maintained at 200° C. or more and the reaction atmosphere may be a non-oxidative atmosphere or a weakly oxidative atmosphere. The object may be fully attained when the reaction atmosphere is a non-oxidative atmosphere, however, depending on the case, the decomposition may be performed in a weakly oxidative atmosphere, for example, in an atmosphere where the gas to be treated contains oxygen in an amount of less than 20 vol %. The concentration of nitrogen fluoride in the gas to be treated is not particularly limited. A 100% nitrogen fluoride gas may be decomposed or the gas may be diluted with an inert gas or further with an oxygen-containing gas. That is, a preferred decomposition temperature is selected according to the concentration of nitrogen fluoride in the gas to be decomposed, the concentration of oxygen in the gas to be treated, SV (space velocity), LV (linear velocity), the nature of the mixture with other gases, the component ratio and form of reactive agent of the present invention, and the amount of by-product such as nitrogen oxides, fluorocarbons and carbon monoxide.

This decomposition treatment may be performed using a decomposition apparatus comprising a reactor filled with the above-described reactive agent, a gas inlet leading to the inside of reactor, a gas outlet for discharging the gas after the reaction from the reactor, a furnace housing the reactor, a heat source for elevating the temperature in the furnace atmosphere to 200° C. or more, and a line for connecting the gas inlet and the nitrogen fluoride-containing gas source.

FIG. 1 is a view showing one example of the apparatus for practicing the present invention. In the figure, 1 is a metal-made reactor (tube) and in this reactor, a reactive agent 2 comprising the reactive agent described above is filled. In the example of the figure, the tube reactor 1 is vertically placed and the reactive agent 2 is filled on a gas permeable bed 3 fixed in the reactor. For the metal tube of the reactor 1, a tube made of stainless steel or nickel-type alloy may be used.

The reactor 1 is installed within a heating furnace 4. The heating furnace 4 shown has as a heat source an electric heater 5 using a heating element capable of generating heat on passing of electricity. By this electric heater 5, the temperature in the furnace atmosphere 6 is elevated to a predetermined temperature and the heat in the furnace is transmitted to the reactive agent 2 through the wall of the metal-made reactor. The heat source is not limited to an electric heater as long as the temperature in the furnace atmosphere 6 can be elevated to a predetermined temperature. For example, a high-temperature gas such as combustion exhaust gas may also be used as the heat source.

On one end of the reactor 1 installed in the heating furnace 4, an inlet 7 for gas to be treated is provided. The inlet 7 for gas to be treated is connected by piping with a container 8 storing nitrogen fluoride. The gas discharging tube 9 from the container 8 has a flow control valve 10. In the example of FIG. 1, an oxygen gas bomb 11 and a nitrogen gas bomb 12 are separately placed in addition to the container 8, and oxygen gas and nitrogen gas discharged from respective bombs once guided to the gas header 17 via gas discharging tubes 15 and 16 through flow control valves 13 and 14, respectively. Nitrogen fluoride is guided to this header 17, where nitrogen gas as a carrier is mixed with the nitrogen fluoride gas and if desired, oxygen gas is added. The gas to be treated thus mixed in the header 17 is sent to the inlet 7 for gas to be treated of the reactor 1 through a gas supply tube 18.

Not limited to this example, it is also possible to prepare a mixed gas by previously mixing nitrogen fluoride, nitrogen and oxygen in one container and send the mixed gas directly to the inlet 7 for gas to be treated. In either case, a tube for introducing oxygen gas is preferably connected to the container 8 or to a line communicating between the container 8 and the inlet 7 for gas treated.

On the other hand, an exhaust gas line 20 is connected to the gas outlet 19 of the reactor 1 and the exhaust gas is discharged out of the system from 23. A gas sampling tube 21 is fixed to the exhaust gas line 20 by a branch pipe and through the sampling tube 21, the exhaust gas line 20 is connected to a halogen absorbing bottle 22 and a gas analyzer 24 to sample the exhaust gas.

In the apparatus of FIG. 1, the temperature of reactive agent 2 in the reactor 1 changes according to the heat balance resulting from the reaction occurring and the balance of heat capacity which fluctuates by the inlet gas and the outlet gas when the atmosphere temperature in the heating furnace 4 is transmitted through the container wall. As shown in the figure, the temperature in the reaction zone is detected by a temperature measuring instrument 26 through a temperature sensor (thermocouple) inserted into almost the center of reactive agent 2 and the quantity of heat supplied from the heat source 5 is controlled so that the temperature can be maintained at a predetermined temperature. Also, the temperature of the furnace atmosphere 6 in the heating furnace 4 is detected by a temperature sensor 27 and based on the detected value, the temperature of the heating furnace itself is appropriately controlled.

In this way, nitrogen fluoride in the gas to be treated is decomposed almost completely (at a decomposition ratio of nearly 100%). The fluorine decomposed reacts with the aluminum compound, iron compound, manganese compound or alkaline earth metal compound in the reactive agent to convert into a stable metal fluoride. Accordingly, the exhaust gas is substantially free of nitrogen fluoride and fluorine component.

Figure 2:
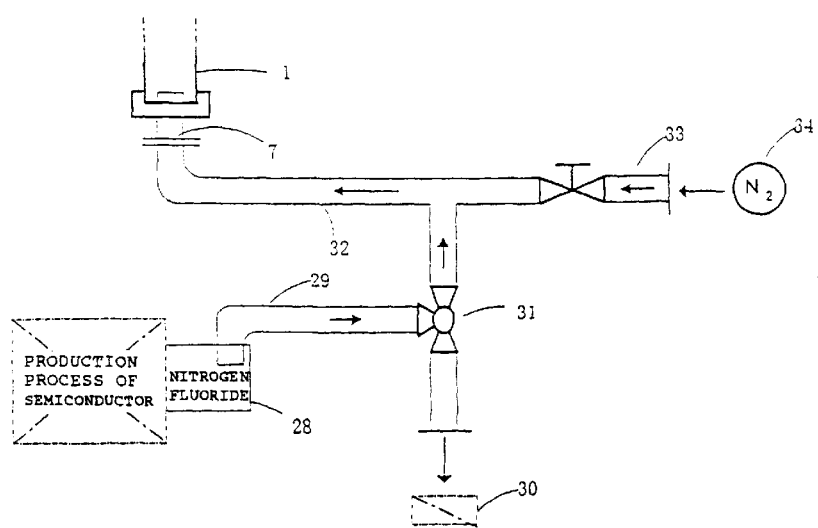
FIG. 2 is a flow sheet of machinery arrangement showing another example of the gas inlet for practicing the process of the present invention.

FIG. 2 is a view showing an example of the case where the nitrogen fluoride used in the manufacturing process of a semiconductor is decomposed according to the present invention. The used nitrogen fluoride 28 discharged from the manufacturing process of a semiconductor is generally sent to a routine treating process 30 through a line 29. In applying the present invention to this treatment, this nitrogen fluoride supply line 29 is connected to the inlet 7 for gas to be treated of the reactor 1. In the example shown, a branch pipe 32 is fixed to the supply line 29 using a three-way valve 31 and this branch pipe 32 is connected to the inlet 7 for gas to be treated. Furthermore, a nitrogen gas supply line 33 is connected to the branch pipe 32 so that nitrogen gas can be supplied from a nitrogen gas source 34 into the branch pipe 32 at a variable flow rate. Accordingly, even when the three-way valve 31 is switched from the reactor 1 side to the treating process 30 side and the gas to be treated is not flowed into the branch pipe 32 side, nitrogen gas in a necessary amount can be supplied from the nitrogen gas source 34.

Figure 3:
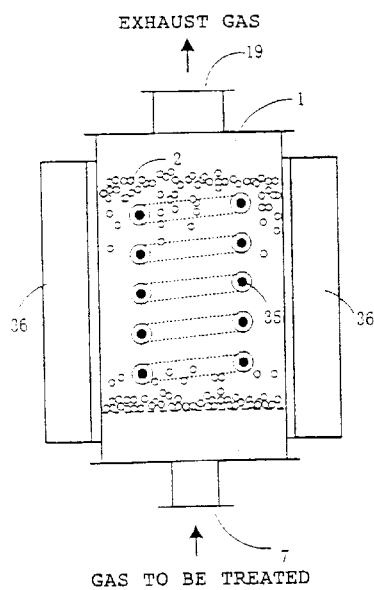
FIG. 3 is a schematic cross section of the reactor part, showing the case where the reactive agent is heated from the inside of the reactor according to the process of the present invention.
Figure 4:
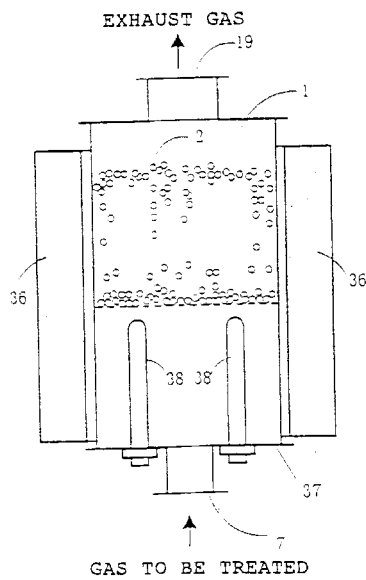
FIG. 4 is a schematic cross section of the reactor part, showing another case where the reactive agent is heated from the inside of the reactor according to the process of the present invention.

FIG. 3 and FIG. 4 each shows an example according to the present invention, where a heating source is installed inside the reactor 1 and heat is transmitted to the reactive agent 2 from the inside of the reactor. In both figures, 36 is a heat-resistant furnace material surrounding the reactor 1, 7 is an inlet for guiding a gas to be treated to the reactor, and 19 is an outlet for discharging the gas from the reactor.

In FIG. 3, heating elements 35 capable of generating heat on passing of electricity are disposed inside the layer filled with the reactive agent 2. The heating elements 35 each has an anticorrosive and heat-resistant cover. In this example, heat is transmitted from the inside of the layer filled with the reactive agent 2, therefore, a temperature necessary for heating the reactive agent to a predetermined temperature can be reached at an increased rate and moreover, heat loss can also be reduced. In the case of the example shown in FIG. 4, the inside of reactor 1 is divided into a layer filled with the reactive agent 2 and a heating layer, and the gas to be treated after it is guided into the reactor 1 is designed to flow into the layer filled with the reactive agent through the heating layer. In the heating layer, heating elements 38 capable of generating heat on passing of electricity are fixed to the reactor cover 37. The gas to be treated is imparted with heat during passing through the heating layer and at the same time, heat is transmitted to the reactive agent 2. In this example, an electric heater is placed in the reactor, therefore, the heat can be very efficiently used.

Figure 5:
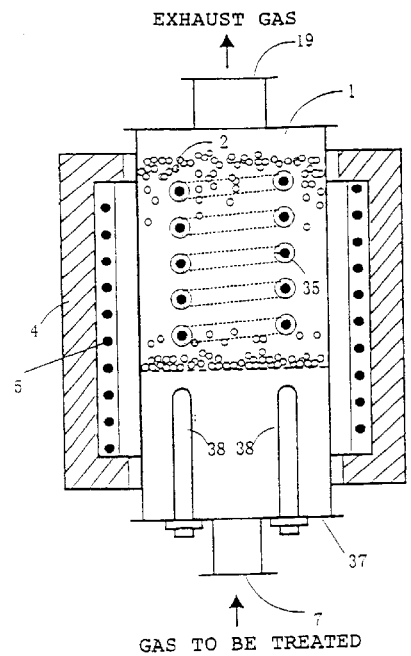
FIG. 5 is a schematic cross section of the reactor part, showing the case where the reactive agent is heated from the inside and outside of the reactor according to the process of the present invention.

FIG. 5 shows a heating system in which the reactor 1, the reactive agent and the gas to be treated are heated by combining the heating methods shown in FIG. 1, FIG. 3 and FIG. 4, whereby the efficiency of heat utilization is increased. When the capacity of the reactor 1 needs to be raised or a limit to the height of the reactor 1 is set, this may generally be handled by increasing the diameter of the reactor 1. In such a case, under any of the single heating methods in FIG. 1, FIG. 3 and FIG. 4, the heat transmission area becomes insufficient, and the heat utilization efficiency drops, due to the temperature gradient in the direction toward the center in horizontal cross sections of the reactor 1. By adopting the system shown in FIG. 5, however, these problems can be overcome.

Figure 6:
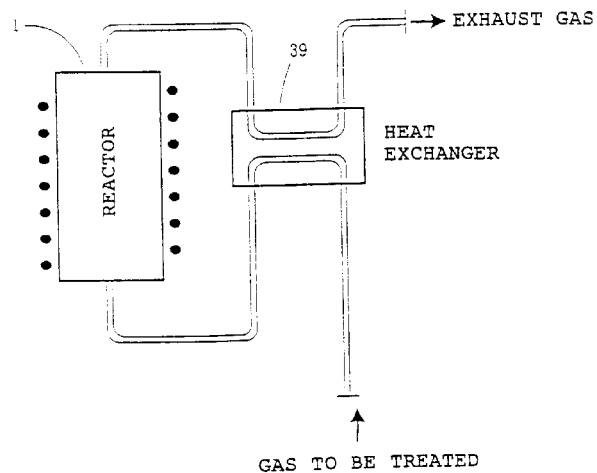
FIG. 6 is a view showing the case where the gas to be treated is heat-exchanged before entering the reactor with the exhaust gas discharged from the reactor in the practice of the present invention.

FIG. 6 is a view showing an example of the present invention, where a heat exchanger 39 is disposed for heat exchanging the gas to be treated before entering the reactor 1 having a heating source, with the exhaust gas discharged from the reactor 1. By disposing the heat exchanger 39, the sensible heat of the exhaust gas is imparted to the gas to be treated and thereby the heat can be recovered, as a result, the heat consumption of the heating source can be decreased.

In the case of the above-described apparatus, the decomposition reaction terminates when the reactive agent filled in the system is used up. The end of reaction can be known by the time when nitrogen fluoride is first detected in the exhaust gas. By employing a batch system such that when the reaction is terminated, the operation of the apparatus is stopped, new reactive agent is filled and the reaction is started, nitrogen fluoride can be sequentially decomposed in the same apparatus.

In order to continuously use this batch system, a multiple tower switch system may also be adopted, where using a plurality of apparatuses of the same type disposed in parallel, the reactive agent of one apparatus is exchanged while another apparatus is operating, and when one apparatus is stopped, the gas passage is switched to another apparatus. Furthermore, when the apparatus used is designed to have a function of continuously or intermittently supplying the reactive agent into the reactor and continuously or intermittently discharging the used reactive agent from the reactor, the operation can be continuously performed for a long period of time in the same apparatus.

EXAMPLES

The present invention is described in greater detail below by referring to Examples, however, the present invention should not be construed as being limited thereto. Unless otherwise indicated, all parts, percents, ratios and the like are by weight.

Preparation of Comparative Reactive Agents 1 to 3

Granular Comparative Reactive Agents 1 to 3 were prepared using the following compounds as starting materials.

Activated carbon powder:

C (Coconut Husk Activated Carbon, produced by Hoku-Etsu Tanso Kogyo)

Alumina powder:

$Al_2O_3$ (hydraulic alumina BK112, produced by Sumitomo Chemical Industry Co., Ltd.)

Potassium carbonate:

$K_2CO_3$ (reagent, extra pure, produced by Jun-Sei Kagaku)

These compounds were mixed in a Henschel mixer at the blending ratio shown in Table 1, granulated by adding water, dried at 110° C. for 4 hours, and dehydration baked using a heat treatment at 400° C. for 3 hours in a nitrogen atmosphere. The resulting baked product was sieved to obtain granular particles having a particle size of from 0.85 to 2.8 mm.

Preparation of Reactive Agents 1 to 10

Granular Reactive Agents 1 to 10 for decomposition were prepared using the following compounds as starting materials.

Activated carbon powder:

C (Coconut Husk Activated Carbon, produced by Hoku-Etsu Tanso Kogyo)

Alumina powder:

$Al_2O_3$ (hydraulic alumina BK112, produced by Sumitomo Chemical Industry Co., Ltd.)

Calcium hydroxide:

$Ca(OH)_2$ (reagent, extra pure, produced by Jun-Sei Kagaku)

Manganese dioxide powder:

$MnO_2$ (reagent, chemical grade, produced by Jun-Sei Kagaku)

Ferric oxide powder:

$Fe_2O_3$ (reagent, chemical grade, produced by Jun-Sei Kagaku)

Nickel oxide powder:

NiO (reagent, chemical grade, produced by Jun-Sei Kagaku)

Stannic oxide:

$SnO_2$ (reagent, chemical grade, produced by Jun-Sei Kagaku)

Cupric oxide powder:

CuO (reagent, chemical grade, produced by Jun-Sei Kagaku)

Potassium carbonate:

$K_2CO_3$ (reagent, extra pure, produced by Jun-Sei Kagaku)

These compounds were mixed in a Henschel mixer by varying the combination and the blending ratio as shown in Table 1, granulated by adding water, dried at 110° C. for 4 hours, and dehydration baked using a heat treatment at 400° C. for 3 hours in a nitrogen atmosphere. The resulting baked product was sieved to obtain granular particles; having a particle size of from 0.85 to 2.8 mm.

In Table 1, the combination of various compounds for preparing Comparative Reactive Agents 1 to 3 and Reactive Agents 1 to 10, the atomic ratio of each metal assuming that carbon is 1.0, and the total % by weight (wt %) of metal atoms including carbon in the reactive agent are shown.

TABLE 1

| Reactive Agent | Composition (combination of compounds) | Mixing Ratio (atomic ratio of metal in compound assuming that C is 1.0) | | | Total Amount of Metals (including C) in Reactive Agent, wt % |
|---|---|---|---|---|---|
| Comparative Example 1 | $Al_2O_3$ | | | | 53 |
| 2 | $C/Al_2O_3$ | C/(Al) 1/0.7 | | | 65 |
| 3 | $C/Al_2O_3/K_2CO_3$ | C/(Al) 1/0.57 | C/K 1/0.04 | | 60 |
| Reactive Agent 1 | $C/Al_2O_3/K_2CO_3/CuO$ | C/Al 1/0.61 | C/K 1/0.03 | C/Cu 1/0.03 | 66 |
| 2 | $C/Al_2O_3/K_2CO_3/CuO$ | C/Al 1/0.75 | C/K 1/0.06 | C/Cu 1/0.04 | 64 |
| 3 | $C/Al_2O_3/K_2CO_3/CuO$ | C/Al 1/0.47 | C/K 1/0.03 | C/Cu 1/0.03 | 69 |
| 4 | $C/Al_2O_3/K_2CO_3/NiO$ | C/Al 1/0.61 | C/K 1/0.03 | C/Cu 1/0.03 | 66 |
| 5 | $C/Al_2O_3/K_2CO_3/NiO/CuO$ | C/Al 1/0.57 | C/K 1/0.03 | C/(Ni + Cu) 1/(0.03 + 0.03) | 68 |
| 6 | $C/Al_2O_3/MnO_2/K_2CO_3/CuO$ | C/(Al + Mn) 1/(0.19 + 0.25) | C/K 1/0.03 | C/Cu 1/0.03 | 71 |
| 7 | $C/Al_2O_3/Fe_2O_3/K_2CO_3/CuO$ | C/(Al + Fe) 1/(0.19 + 0.27) | C/K 1/0.03 | C/Cu 1/0.03 | 74 |
| 8 | $C/Al_2O_3/Ca(OH)_2/K_2CO_3/NiO/CuO$ | C/(Al + Ca) 1/(0.42 + 0.13) | C/K 1/0.03 | C/(Ni + Cu) 1/(0.03 + 0.03) | 70 |
| 9 | $C/Al_2O_3/K_2CO_3/CuO/SnO_2$ | C/Al 1/0.57 | C/K 1/0.03 | C/(Cu + Sn) 1/(0.01 + 0.02) | 65 |
| 10 | $C/Al_2O_3/Ca(OH)_2/K_2CO_3/CuO/SnO_2$ | C/(Al + Ca) 1/(0.42 + 0.13) | C/K 1/0.03 | C/(Cu + Sn) 1/(0.01 + 0.02) | 66 |

Reaction Example

The decomposition process of the present invention was performed using an apparatus having the same arrangement as shown in FIG. 1. Along the center of the axis of a tube furnace (electric capacity: 1.4 kw, length: 400 mm) with heating elements (kanthal alloy) capable of generating heat on passage of electricity, a reaction tube comprising Inconel 600 and having an internal diameter of 16 mm and a length of 500 mm was pierced and 35 cc of a reactive agent for decomposing nitrogen fluoride was filled in the furnace center of the reaction tube.

Nitrogen trifluoride ($NF_3$) was used as the nitrogen fluoride to be decomposed, and after adding or not adding oxygen gas, the nitrogen trifluoride was introduced into the above-described reaction tube using nitrogen gas as a carrier.

The reaction conditions were set constant as follows.

Flow rate of gas to be treated: 0.201/min

Concentration of nitrogen fluoride 3 vol % in gas to be treated:

Space velocity of gas to be treated: 343 $hr^{-1}$

Linear velocity of gas to be treated: 1.0 m/min

Concentration of oxygen in gas 0% or 5 vol % to be treated:

In some tests, HF or $SiF_4$ was mixed in the gas to be treated.

In each Example, the gas to be treated was introduced after starting charging of the heating element and confirming that the temperature at the center part of reactive agent reached a predetermined temperature. During the reaction, the quantity of electricity in the tube furnace was controlled so that the temperature measured by a thermocouple inserted into the center part of reactive agent (the site reaching a highest temperature in the bulk of reactive agent) could be maintained at a predetermined temperature. In Table 2, the reaction temperature indicates this temperature maintained during the reaction.

As shown in FIG. 1, a part of the exhaust gas discharged from the reaction tube was guided to a gas analyzer and also to a fluorine absorbing bottle containing a caustic soda solution, and sampled. The exhaust gas was analyzed as to nitrogen fluoride, other fluorine compounds, $O_2$, $N_2$, NO, $N_2O$, $CO_2$, CO and $F^-$.

Using Comparative Reactive Agents 1 to 3 and Reactive Agents 1 to 10 shown in Table 1, nitrogen trifluoride was decomposed under the above-described conditions by varying the reactive agent temperature. The results obtained are shown in Table 2. In Table 2, the concentration of by-product and the decomposition ratio of $NF_3$ indicate concentration of by-product and decomposition ratio of $NF_3$ in the exhaust gas 60 minutes after the initiation of the reaction. More specifically, by-products ($F^-$, NO, $N_2O$, $CF_4$, CO) and nitrogen fluoride remaining in the exhaust gas were measured in the exhaust gas sample taken 60 minutes after the initiation of the reaction, and the concentration of each by-product and the ratio in the percentage of nitrogen fluoride in the exhaust gas to the nitrogen fluoride in the gas to be treated are shown.

TABLE 2

| Test No. | Reaction Temperature (° C.) | Concentration of Gas Composition to be Treated (vol %) | | | | By-Product (vol %) | | | | | Decomposition Ratio of $NF_3$ (%) |
|---|---|---|---|---|---|---|---|---|---|---|---|
| | | $NF_3$ | $O_2$ | $SiF_4$ | HF | $F^-$ | $NO_x$ (NO + $NO_2$) | $N_2O$ | $CF_4$ | CO | |
| Comparative Example 1 | 300 | 3 | 0 | 0 | 0 | <0.0001 | 0.5 | 0.004 | <0.001 | <0.001 | 96.3 |
| 2 | 250 | 3 | 0 | 0 | 0 | <0.0001 | >0.5 | 0.228 | <0.001 | 0.114 | 98.2 |
| | 300 | 3 | 0 | 0 | 0 | <0.0001 | >0.5 | 0.284 | <0.001 | 0.167 | <99.9 |
| | 400 | 3 | 0 | 0 | 0 | <0.0001 | 0.04 | 0.088 | 0.009 | 0.265 | <99.9 |
| 3 | 200 | 3 | 0 | 0 | 0 | <0.0001 | 0.5 | 0.449 | <0.001 | 0.095 | 98.2 |
| | 250 | 3 | 0 | 0 | 0 | <0.0001 | <0.0005 | <0.001 | <0.001 | 0.135 | <99.9 |
| | 450 | 3 | 0 | 0 | 0 | <0.0001 | <0.0005 | <0.001 | 0.261 | 0.231 | <99.9 |
| Reactive Agent 1 | 200 | 3 | 0 | 0 | 0 | <0.0001 | 0.03 | 0.435 | <0.001 | <0.001 | 99.5 |
| | 250 | 3 | 0 | 0 | 0 | <0.0001 | 0.0015 | 0.010 | <0.001 | <0.001 | <99.9 |
| | 300 | 3 | 0 | 0 | 0 | <0.0001 | <0.0005 | <0.001 | <0.001 | <0.001 | <99.9 |
| | 450 | 3 | 0 | 0 | 0 | <0.0001 | <0.0005 | <0.001 | 0.165 | <0.001 | 99.5 |
| 2 | 300 | 3 | 0 | 0.5 | 0.1 | <0.0001 | <0.0005 | <0.001 | <0.001 | <0.001 | <99.9 |
| | 300 | 3 | 5 | 0 | 0 | <0.0001 | <0.0005 | <0.001 | <0.001 | <0.001 | <99.9 |
| 3 | 300 | 3 | 0 | 0.5 | 0.1 | <0.0001 | <0.0005 | <0.001 | <0.001 | <0.001 | <99.9 |
| | 300 | 3 | 5 | 0 | 0 | <0.0001 | <0.0005 | <0.001 | <0.001 | <0.001 | <99.9 |
| 4 | 250 | 3 | 0 | 0 | 0 | <0.0001 | 0.002 | 0.008 | <0.001 | <0.001 | <99.9 |
| | 300 | 3 | 0 | 0 | 0 | <0.0001 | <0.0005 | <0.001 | <0.001 | <0.001 | <99.9 |
| 5 | 250 | 3 | 0 | 0 | 0 | <0.0001 | 0.0018 | 0.007 | <0.001 | <0.001 | <99.9 |
| | 450 | 3 | 0 | 0 | 0 | <0.0001 | <0.0005 | <0.001 | 0.175 | <0.001 | <99.9 |
| 6 | 250 | 3 | 0 | 0 | 0 | <0.0001 | 0.0015 | 0.012 | <0.001 | <0.001 | <99.9 |
| | 450 | 3 | 0 | 0 | 0 | <0.0001 | <0.0005 | <0.001 | 0.156 | <0.001 | <99.9 |
| 7 | 250 | 3 | 0 | 0 | 0 | <0.0001 | 0.0023 | 0.009 | <0.001 | <0.001 | <99.9 |
| | 450 | 3 | 0 | 0 | 0 | <0.0001 | <0.0005 | <0.001 | 0.186 | <0.001 | <99.9 |
| 8 | 250 | 3 | 0 | 0 | 0 | <0.0001 | 0.0009 | 0.008 | <0.001 | <0.001 | <99.9 |
| | 300 | 3 | 0 | 0 | 0 | <0.0001 | <0.0005 | <0.001 | <0.001 | <0.001 | <99.9 |
| | 450 | 3 | 0 | 0 | 0 | <0.0001 | <0.0005 | <0.001 | 0.211 | <0.001 | <99.9 |
| 9 | 300 | 3 | 0 | 0 | 0 | <0.0001 | <0.0005 | <0.001 | <0.001 | <0.001 | <99.9 |
| | 400 | 3 | 0 | 0 | 0 | <0.0001 | <0.0005 | <0.001 | 0.008 | <0.001 | <99.9 |
| 10 | 300 | 3 | 0 | 0 | 0 | <0.0001 | <0.0005 | <0.001 | <0.001 | <0.001 | <99.9 |
| | 400 | 3 | 0 | 0 | 0 | <0.0001 | <0.0005 | <0.001 | 0.005 | <0.001 | <99.9 |

It is seen from the results in Table 2 that in the case of the reactive agent using only $Al_2O_3$ (compound of group (II)) of Comparative Example 1, a reaction temperature as high as 300° C. or more is necessary for decomposing $NF_3$ nearly to an extent of 100% and moreover, generation of $NO_x$ cannot be controlled.

In the case of the reactive agent using a combination of activated carbon and $Al_2O_3$ (compound of group (II)) of Comparative Example 2, decomposition of $NF_3$ nearly to an extent of 100% may be attained at a reaction temperature of 250° C. or more but generation of $NO_x$, $N_2O$ and CO cannot be controlled. By elevating the reaction temperature to from 300 to 400° C., generation of $NO_x$, and $N_2O$ may be controlled, however, generation of $CF_4$ occurs at around 400° C.

In the case of the reactive agent using a combination of activated carbon, $Al_2O_3$ (compound of group (II)) and $K_2CO_3$ (compound of group (III)) of Comparative Example 3, decomposition of $NF_3$ nearly to an extent of 100% may be attained at a reaction temperature of 200° C. or more, however, in a similar manner to the case of Comparative Example 2, it is impossible to control generation of CO at all temperatures. Moreover, $CF_4$ is generated at around 450° C.

Generation of $NO_x$ and $N_2O$ can be satisfactorily controlled at a reaction temperature of 250° C. or more.

As such, the reactive agents using a combination of compounds of groups (I) to (III) may decompose $NF_3$ nearly in 100% at a reaction temperature of 200° C. or more and by setting the reaction temperature at from 250 to 450° C., generation of $NO_x$, $N_2O$ and $CF_4$ can be simultaneously controlled. However, generation of CO cannot be controlled at the same time.

On the other hand, in the case of the decomposing agents of Examples 1 to 10 of the present invention which are each prepared by adding a compound of group (IV) to the compounds of groups (I) to (III), the temperature of decomposing $NF_3$ and the temperature range capable of controlling generation of $NO_x$, $N_2O$ and $CF_4$ are the same as in the case using the reactive agent of Comparative Example 3 but, as seen in Table 2, CO is not generated at any temperature of reactive agents 1 to 10. Furthermore, as seen in Reaction Examples 2 and 3, $NF_3$ is completely decomposed and $NO_x$, $N_2O$, $CF_4$ and CO are not generated irrespective of the presence or absence of oxygen, $SiF_4$ or HF in the gas to be treated. From the fact that $F^-$ is not detected, it is also seen that $SiF_4$ and HF are simultaneously decomposed.

As described in the foregoing, according to the present invention, nitrogen fluoride can be efficiently decomposed at a relatively low temperature by a simple formulation and the fluorine decomposed can be fixed as a harmless substance. More specifically, the process for decomposing nitrogen fluoride of the present invention can be practiced using a simple decomposition apparatus, the processing operation is easy, the decomposition efficiency is high, generation of nitrogen oxides, fluorocarbon and carbon monoxide as by-products is controlled, the decomposed product is a stable fluoride such as $AlF_3$, and accordingly, the post-treatment is facilitated. Also in view of reduction in the cost of reactive agent, the effect is larger than in conventional techniques. Thus, the present invention can greatly contribute to the decomposition of used nitrogen fluoride generated, particularly, in the manufacturing process of semiconductors.

While the invention has been described in detail and with reference to specific embodiments thereof, it will be apparent to one skilled in the art that various changes and modifications can be made therein without departing from the spirit and scope thereof.

What is claimed is:

1. A reactive agent for decomposing nitrogen fluoride, comprising compounds of the following groups (I) to (IV):

group (I): elemental carbon;

group (II): an aluminum compound, an iron compound, a manganese compound and/or an alkaline earth metal compound;

group (III): an alkali metal compound; and group (IV): a nickel compound, a tin compound and/or a copper compound;

wherein the composition ratios of compounds of groups (I) to (IV) present in said reactive agent is in terms of the atomic ratio of each metal present in the compounds of groups (II) to (IV) based on the atomic ratio of the elemental carbon of group (I) being 1, such that the compound of group (II) is from 0.05 to 1.0, the compound of group (III) is from 0.01 to 0.2, and the compound of group (IV) is from 0.01 to 0.2.

2. The reactive agent for decomposing nitrogen fluoride as claimed in claim 1, wherein the elemental carbon of group (I) present in said reactive agent is activated carbon, carbon black, coke, char carbon, coal, pitch or charcoal.

3. The reactive agent for decomposing nitrogen fluoride as claimed in claim 1 or 2, wherein in the compounds of group (II) present in said reactive agent, the aluminum compound is aluminum oxide or aluminum hydroxide, the iron compound is iron oxide or iron hydroxide, the manganese compound is manganese oxide or manganese hydroxide, the alkaline earth metal compound is oxide, hydroxide or carbonate of alkaline earth metal.

4. The reactive agent for decomposing nitrogen fluoride as claimed in claim 1 or 2, wherein the alkali metal compound of group (III) present in said reactive agent is an oxide, hydroxide, carbonate, phosphate, aluminate, nitrate or sulfate of an alkali metal.

5. The reactive agent for decomposing nitrogen fluoride as claimed in claim 1 or 2, wherein in the compounds of group (IV) present in said reactive agent, the nickel compound is nickel oxide or nickel hydroxide, the tin compound is stannic oxide or metastannic acid, and the copper compound is copper oxide or copper hydroxide.

6. The reactive agent for decomposing nitrogen fluoride as claimed in claim 1 or 2, wherein the total weight of the elemental carbon of group (I) and metal atoms present in the compounds of groups (II) to (IV) is 50 wt % or more based on the weight of said reactive agent.

7. The reactive agent for decomposing nitrogen fluoride as claimed in claim 1 or 2, wherein said nitrogen fluoride is nitrogen trifluoride.

8. A process for decomposing nitrogen fluoride, comprising contacting a gas containing nitrogen fluoride with a reactive agent for decomposition comprising compounds of the following groups (I) to (IV):

group (I): elemental carbon;

group (II): an aluminum compound, an iron compound, a manganese compound and/or an alkaline earth metal compound;

group (III): an alkali metal compound; and group (IV): a nickel compound, a tin compound and/or a copper compound;

at 200° C. or more.

9. The process for decomposing nitrogen fluoride as claimed in claim 8, wherein the elemental carbon of group (I) present in the reactive agent is activated carbon, carbon black, coke, char carbon, coal, pitch or charcoal.

10. The process for decomposing nitrogen fluoride as claimed in claim 8 or 9, wherein a gas containing nitrogen fluoride is contacted at a temperature of 450° C. or less to control generation of fluorocarbon as by-product.

11. The process for decomposing nitrogen fluoride as claimed in claim 10, wherein a gas containing nitrogen fluoride is contacted at a temperature of 250° C. or more to control generation of nitrogen oxides, fluorocarbon and carbon monoxide as by-products.

* * * * *